United States Patent
Ishibashi

(10) Patent No.: US 12,241,751 B2
(45) Date of Patent: Mar. 4, 2025

(54) INFORMATION PROVIDING APPARATUS

(71) Applicant: SUBARU CORPORATION, Tokyo (JP)

(72) Inventor: Tatsuya Ishibashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/925,475

(22) PCT Filed: Jun. 17, 2021

(86) PCT No.: PCT/JP2021/023096
§ 371 (c)(1),
(2) Date: Nov. 15, 2022

(87) PCT Pub. No.: WO2022/264379
PCT Pub. Date: Dec. 22, 2022

(65) Prior Publication Data
US 2024/0219189 A1 Jul. 4, 2024

(51) Int. Cl.
*G01C 21/34* (2006.01)
*G01C 21/36* (2006.01)

(52) U.S. Cl.
CPC ..... *G01C 21/3469* (2013.01); *G01C 21/3679* (2013.01)

(58) Field of Classification Search
CPC . G01C 21/34; G01C 21/3469; G01C 21/3679
See application file for complete search history.

(56) References Cited

U.S. PATENT DOCUMENTS

| | | | |
|---|---|---|---|
| 6,864,807 B2* | 3/2005 | Todoriki | B60L 53/64 340/988 |
| 9,937,794 B2* | 4/2018 | Bellin | B60L 53/665 |
| 10,976,170 B2* | 4/2021 | Morgan-Brown | G01C 21/3476 |
| 11,981,225 B2* | 5/2024 | Saka | G01C 21/3682 |
| 2011/0032110 A1* | 2/2011 | Taguchi | B60L 3/12 340/636.1 |
| 2011/0224900 A1* | 9/2011 | Hiruta | G01C 21/3469 701/533 |
| 2011/0241905 A1* | 10/2011 | Niwa | G01C 21/3682 340/995.1 |
| 2012/0032637 A1* | 2/2012 | Kotooka | B60W 10/06 320/109 |
| 2012/0194346 A1* | 8/2012 | Tsai | B60W 50/14 701/22 |

(Continued)

FOREIGN PATENT DOCUMENTS

JP 2013-104680 A 5/2013

*Primary Examiner* — Carl C Staubach
(74) *Attorney, Agent, or Firm* — TROUTMAN PEPPER LOCKE LLP

(57) ABSTRACT

An information providing apparatus included in a vehicle includes: a remaining-amount-of-power acquisition unit that calculates a forecasted remaining amount of power for a forecasted travel point of a host vehicle; a range calculation unit that calculates, as a reachable range, a predetermined range from a charging facility on the basis of a record of a remaining amount of power of the vehicle and a record of using the charging facility of the vehicle; and a presentation processing unit that presents a scheduled travel route selected on the basis of the reachable range.

9 Claims, 10 Drawing Sheets

(56) References Cited

U.S. PATENT DOCUMENTS

| | | | |
|---|---|---|---|
| 2013/0063283 A1* | 3/2013 | Kashima | G01C 21/3679 340/988 |
| 2013/0238230 A1* | 9/2013 | Onogi | B60L 53/66 701/123 |
| 2013/0282265 A1* | 10/2013 | Arita | B60L 1/003 701/123 |
| 2015/0177009 A1* | 6/2015 | Saito | G01C 21/34 701/424 |
| 2015/0247734 A1* | 9/2015 | Okada | G01C 21/3469 701/423 |
| 2015/0316389 A1* | 11/2015 | Inoue | G01C 21/3469 701/521 |
| 2017/0010116 A1* | 1/2017 | Inoue | B60L 58/12 |
| 2017/0138750 A1* | 5/2017 | Weber | B60L 58/13 |
| 2019/0178663 A1* | 6/2019 | Mukai | G01C 21/34 |
| 2021/0404838 A1* | 12/2021 | Naito | B60L 58/12 |

* cited by examiner

FIG. 8

|  | DISTANCE (km) | LAP VALUE = 0 | STANDARD DEVIATION | MEAN VALUE |
|---|---|---|---|---|
| ROUTE R1 | 15 | ABSENT | 0.8 | 2.1 |
| ROUTE R2 | 13 | 1 | 1.5 | 1.8 |
| ROUTE R3 | 12 | ABSENT | 1.6 | 2.3 |
| ROUTE R4 | 14 | ABSENT | 0.8 | 2.0 |

INFORMATION PROVIDING APPARATUS

CROSS REFERENCE TO RELATED APPLICATION

The present application is a U.S. National Phase Application under 35 U.S.C. § 371 of International Patent Application No. PCT/JP2021/023096 filed Jun. 17, 2021. The entire contents of which are hereby incorporated by reference.

TECHNICAL FIELD

The invention relates to an information providing apparatus that provides information about a travel route in consideration of use of a charging facility.

BACKGROUND

Electric vehicles, which can travel without using fuel such as gasoline, and hybrid vehicles, which can travel using both fuel and electricity as energy sources, have become widespread.

However, the spread of charging facilities capable of charging a battery for traveling is insufficient.

In order to cope with the small number of charging facilities, a technique for providing information about charging facilities is known. For example, Japanese Unexamined Patent Application Publication No. 2013-104680 discloses a technique for extracting and displaying reachable charging facilities using travel history data.

SUMMARY

However, with the technique disclosed above, although it is possible to present reachable charging facilities at the present time, it is not possible to present a reachable charging facility from a point to which a vehicle is forecasted to travel by a certain distance.

Therefore, in a case where a charging facility is searched for after the vehicle is made to travel until the remaining amount of power falls below a predetermined value, then there may be no reachable charging facilities.

Therefore, an object of the invention is to prevent a situation in which there are no reachable charging facilities in the process of heading for a destination.

An information providing apparatus according to the invention includes: a remaining-amount-of-power acquisition unit that calculates a forecasted remaining amount of power for a forecasted travel point of a host vehicle; a range calculation unit that calculates, as a reachable range, a predetermined range from a charging facility on the basis of a record of a remaining amount of power of a vehicle and a record of using the charging facility of the vehicle; and a presentation processing unit that presents a scheduled travel route selected on the basis of the reachable range.

Accordingly, it is possible to present the scheduled travel route such that the forecasted travel point is included in the reachable range of any charging facility.

According to the invention, it is possible to prevent a situation in which there are no charging facilities reachable from the forecasted traveling point on the scheduled travel route.

BRIEF DESCRIPTION OF DRAWINGS

FIG. 8 is a table for explaining a relationship between various kinds of information about a distance to a destination and a lap value for each route.

DETAILED DESCRIPTION

An embodiment of an information providing apparatus according to the invention will be described below with reference to the accompanying drawings.

Figure 1:
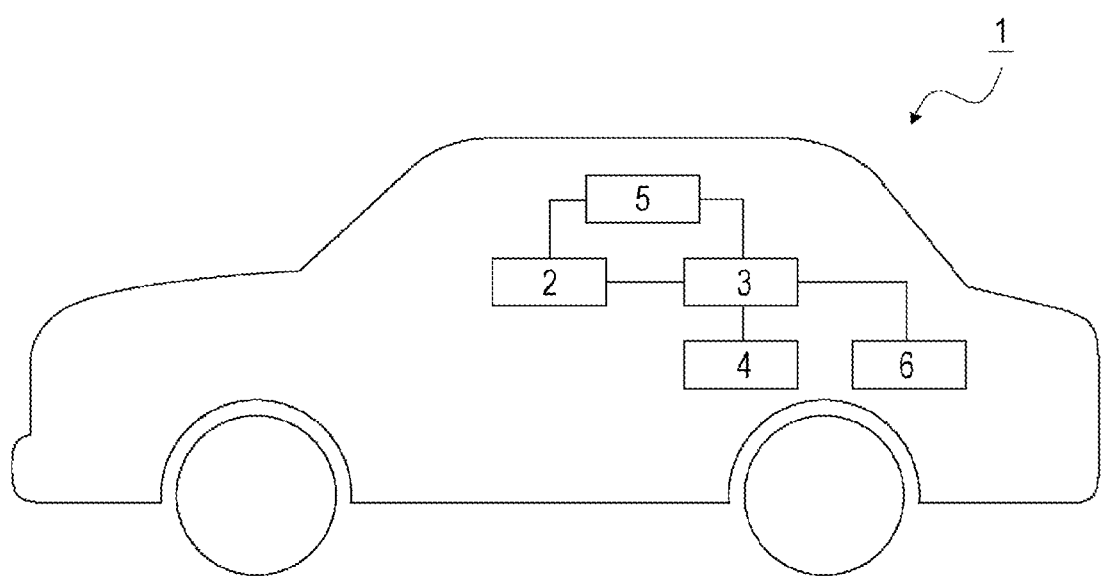
FIG. 1 is a schematic block diagram of a vehicle according to an embodiment of the invention.

FIG. 1 illustrates a configuration example of a vehicle 1 provided with the information providing apparatus according to the invention. The vehicle 1 is an electric vehicle, a hybrid vehicle, or the like, and includes a traveling battery 2, a power control unit (PCU) 3, a motor 4, a control unit 5, and a connector unit 6.

The traveling battery 2 is a high-voltage battery. The traveling battery 2 supplies electric power used for driving wheels and electric power used for operating various electronic devices of the vehicle 1. FIG. 1 illustrates supply of electric power used for driving wheels from the traveling battery 2, and illustration of supply of electric power used for operating other units is omitted.

The traveling battery 2 is charged on the basis of a direct current voltage supplied from the PCU 3.

The traveling battery 2 supplies a power supply voltage for driving the motor 4 to the PCU 3.

The PCU 3 includes an inverter, a DC/DC converter, and the like for driving the motor 4.

The PCU 3 generates an alternating current for driving the motor 4 on the basis of the supplied power supply voltage and supplies the alternating current to the motor 4. The PCU 3 controls the torque of the motor 4 by controlling the alternating current. Furthermore, the PCU 3 may also include an energy efficiency optimization function using regenerative energy by including a regenerative brake function.

The motor 4 is configured as a motor generator having a power generation function, and drives the wheels on the basis of the supplied alternating current.

The control unit 5 includes a central processing unit (CPU), a memory, and the like, and performs overall control of the vehicle 1. The control unit 5 may be provided as a single unit, or may be configured by a plurality of electronic control units (ECUs). The plurality of ECUs may include various ECUs such as a battery control ECU that performs charge control of the traveling battery 2, a display control ECU that performs display control of a display device (including a meter and the like) included in the vehicle 1, an airbag control ECU, and an air-conditioning control ECU.

The connector unit 6 has a structure such that a charging plug included in a charging device installed in a charging facility P can be inserted. The connector unit 6 outputs an alternating current voltage supplied via the inserted charging plug to the PCU 3. The PCU 3 charges the traveling battery 2 by supplying a direct current voltage, converted by including an AC/DC converter, to the traveling battery 2.

The control unit 5 in this embodiment can perform control according to a remaining amount of power in the traveling battery 2.

The information indicating the remaining amount of power in the traveling battery 2 is, for example, a state of charge (SOC) of the traveling battery 2. The SOC is calculated using measured values such as an output current value and an output voltage value of the traveling battery 2. Note that the PCU 3 may manage information on the SOC, and the control unit 5 may acquire the SOC from the PCU 3.

In addition to the SOC, the control unit 5 uses kWh (kilowatt-hours) to handle the remaining amount of power in the traveling battery 2. The control unit 5 can perform control based on the remaining amount of power represented by kWh.

The reason why the remaining amount of power represented by kWh is used is that the control unit 5 performs control using not only information on the vehicle 1 as a host vehicle but also information on other vehicles.

Figure 2:
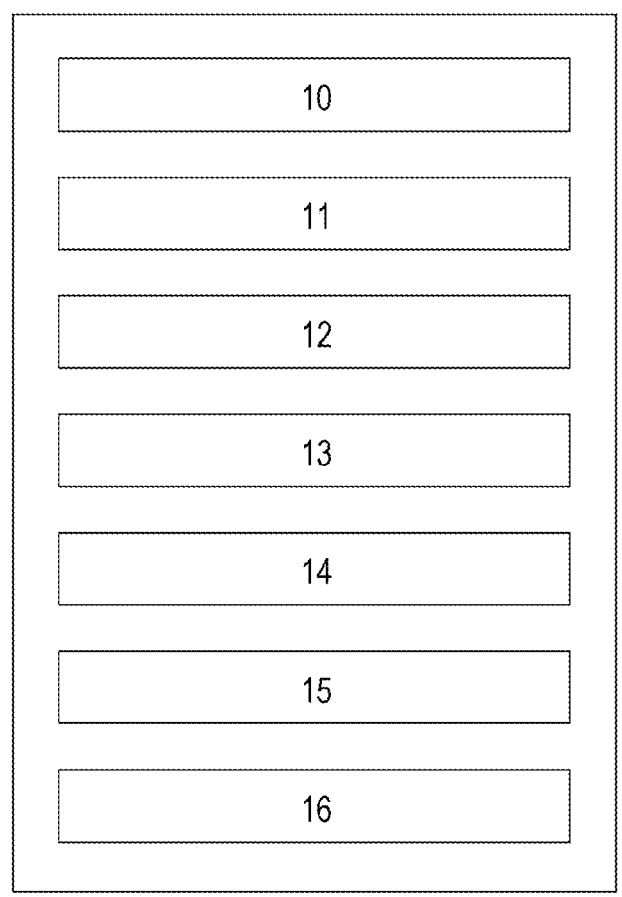
FIG. 2 is a diagram illustrating a functional configuration of a control unit.

A functional configuration of the control unit 5 included in the vehicle 1 will be described with reference to FIG. 2. The functional configuration of the control unit 5 is also a functional configuration included in the information providing apparatus according to the invention. That is, the information providing apparatus provides information to a driver or the like of the vehicle 1 by having various functions configured by the control unit 5. In the following description, the driver, a fellow passenger, or the like will be described as a "user".

The control unit 5 includes a remaining-amount-of-power acquisition unit 10, a range information acquisition unit 11, a route search unit 12, a lap value calculation unit 13, a selection processing unit 14, a presentation processing unit 15, and a communication processing unit 16.

The remaining-amount-of-power acquisition unit 10 acquires information about the traveling battery 2.

The information about the traveling battery 2 is, for example, information about the remaining amount of power in the traveling battery 2, and is information on SOC, information represented by kWh, or the like.

The range information acquisition unit 11 acquires information on a reachable range. The reachable range is contour line information represented by setting the charging facility P as a center, and indicates a range in which the charging facility P is reachable, on a map for each remaining amount of power. A specific example will be described with reference to FIG. 3.

A current position of the vehicle 1 as the host vehicle is defined as a current position A. A range in which the vehicle 1 whose remaining amount of power is 30% or more can reach the charging facility P is defined as a reachable range P-30. That is, if the current position A is included in the reachable range P-30 and the remaining amount of power of the vehicle 1 is 30% or more, the vehicle 1 can reach the charging facility P before the remaining amount of power runs out.

The reachable range P-30 is a range centered on the charging facility P.

Figure 3:
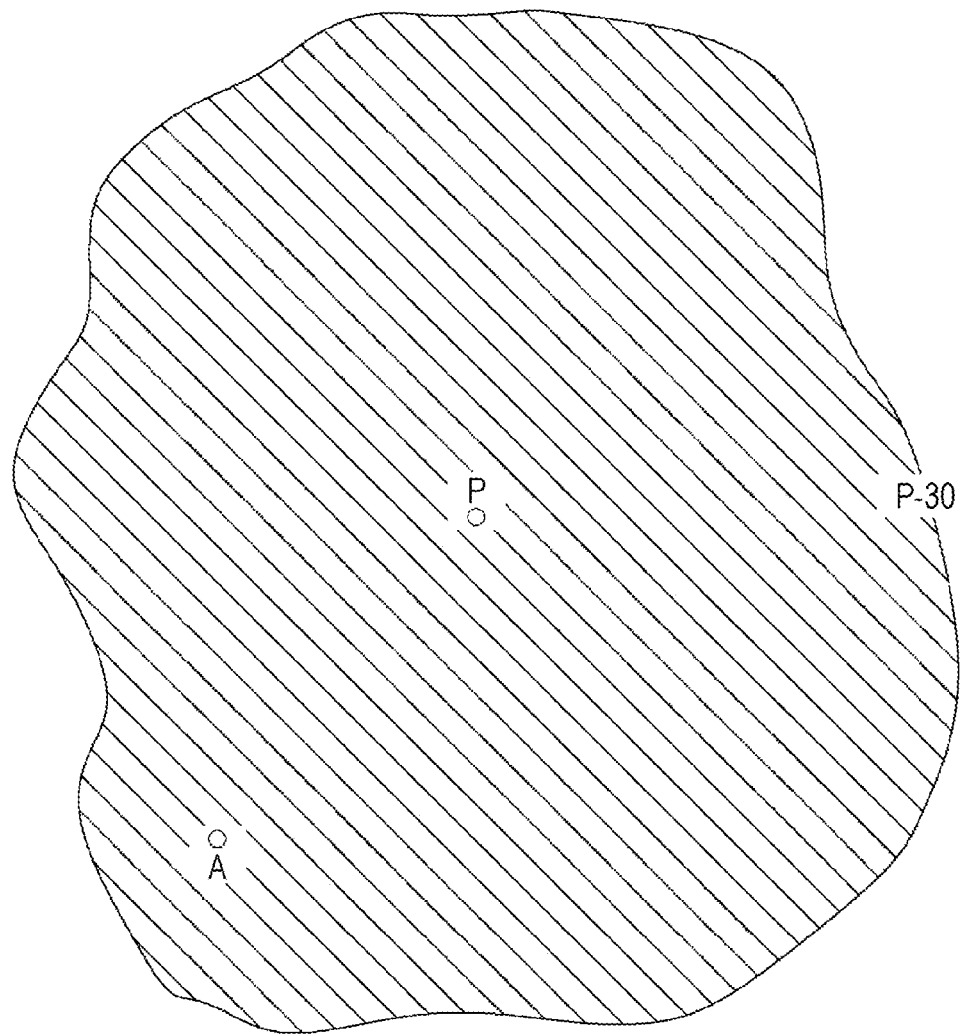
FIG. 3 is a diagram illustrating an example of a reachable range.

In FIG. 3, the reachable range P-30 is illustrated as a hatched region.

Various methods of calculating the reachable range are conceivable. For example, a travel history and a consumption history of the remaining amount of power of the vehicle 1 as the host vehicle may be stored, and the reachable range may be calculated on the basis of the information. In an area where the vehicle 1 has not traveled yet, the reachable range may be calculated on the basis of electric efficiency information of the host vehicle and information that affects the electric efficiency, such as a topography and traffic congestion information of the target area.

Alternatively, the reachable range may be calculated using a travel history, a history of the remaining amount of power, and the like of other vehicles. For example, a reference point (for example, the current position A) of the vehicle 1 (including other vehicles) whose remaining amount of power is 30% or more is stored in the vehicle 1. In response to detection of charging of the vehicle 1 using the charging facility P, the stored reference point of the vehicle 1 and information specifying the charging facility P used for the charging are transmitted as a set to a server apparatus.

The server apparatus accumulates a history of using the charging facility P and information on the reference point received from various vehicles 1 in association with each other. Then, the server apparatus plots, on the map, the information of the reference point associated with the information indicating that charging has been performed at the charging facility P. Thus, it is possible to set, as the reachable range P-30, a range in which the vehicle 1 whose remaining amount of power is 30% or more can reach the charging facility P.

The information on the reachable range calculated in this manner can be used as a criterion for determining whether the charging facility P is reachable even for the vehicle 1 that has not used the charging facility P.

The electric efficiency may vary depending on the type or the like of the vehicle 1. For example, in a case where the reachable range is a range calculated on the basis of the history information of another vehicle having a high electric efficiency, even if the current position A of the vehicle 1 is included in the reachable range, the charging facility P may be unreachable when the vehicle 1 actually travels.

Therefore, the reachable range may be calculated including a margin. For example, to calculate the range in which the vehicle 1 whose remaining amount of power is 30% or more can reach the charging facility P, a history of a case where another vehicle whose remaining amount of power is 40% or more could reach the charging facility P may be used.

FIG. 3 illustrates the single reachable range for the vehicle 1 whose remaining amount of power is 30% or more, with the charging facility P as the center. However, a plurality of reachable ranges may also be illustrated.

Figure 4:
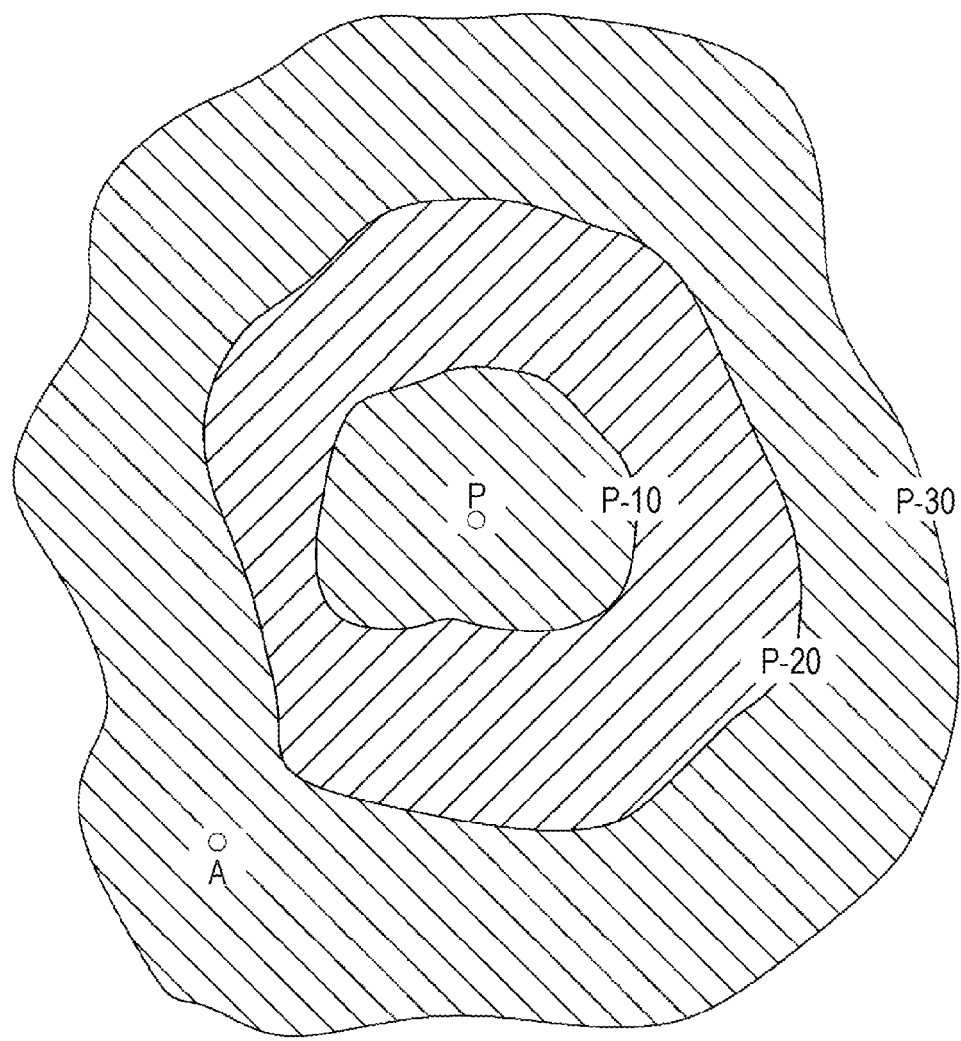
FIG. 4 is a diagram illustrating other examples of the reachable range.

The example illustrated in FIG. 4 illustrates, with the charging facility P as the center, the reachable range P-30 for the vehicle 1 whose remaining amount of power is 30% or more, a reachable range P-20 for the vehicle 1 whose remaining amount of power is 20% or more, and a reachable range P-10 for the vehicle 1 whose remaining amount of power is 10% or more.

The information of the travel history and the history of the remaining amount of power of other vehicles used for calculation of the reachable range may be limited to information obtained in a most recent predetermined period. Information such as road conditions and traffic stops is information that changes according to time or period. For example, if the reachable range is calculated on the basis of the travel history obtained at the time when a currently closed road was available, there is a possibility that the reachable range is set as a range wider than an actual reachable range. In order to prevent such a situation, it is preferable to set the reachable range using the travel history obtained in the most recent predetermined period.

In addition, the predetermined period may be set to be shorter in an area where a larger number of travel histories are obtained. For example, in a case where a sufficient amount of travel history or the like can be obtained in one day, the predetermined period is set to one day. On the other hand, in a case where it takes about one month to obtain a sufficient amount of travel history or the like, the predetermined period is set to one month. In this way, by varying the predetermined period according to the area, it is possible to calculate the reachable range using appropriate history information for each area.

Figure 5:
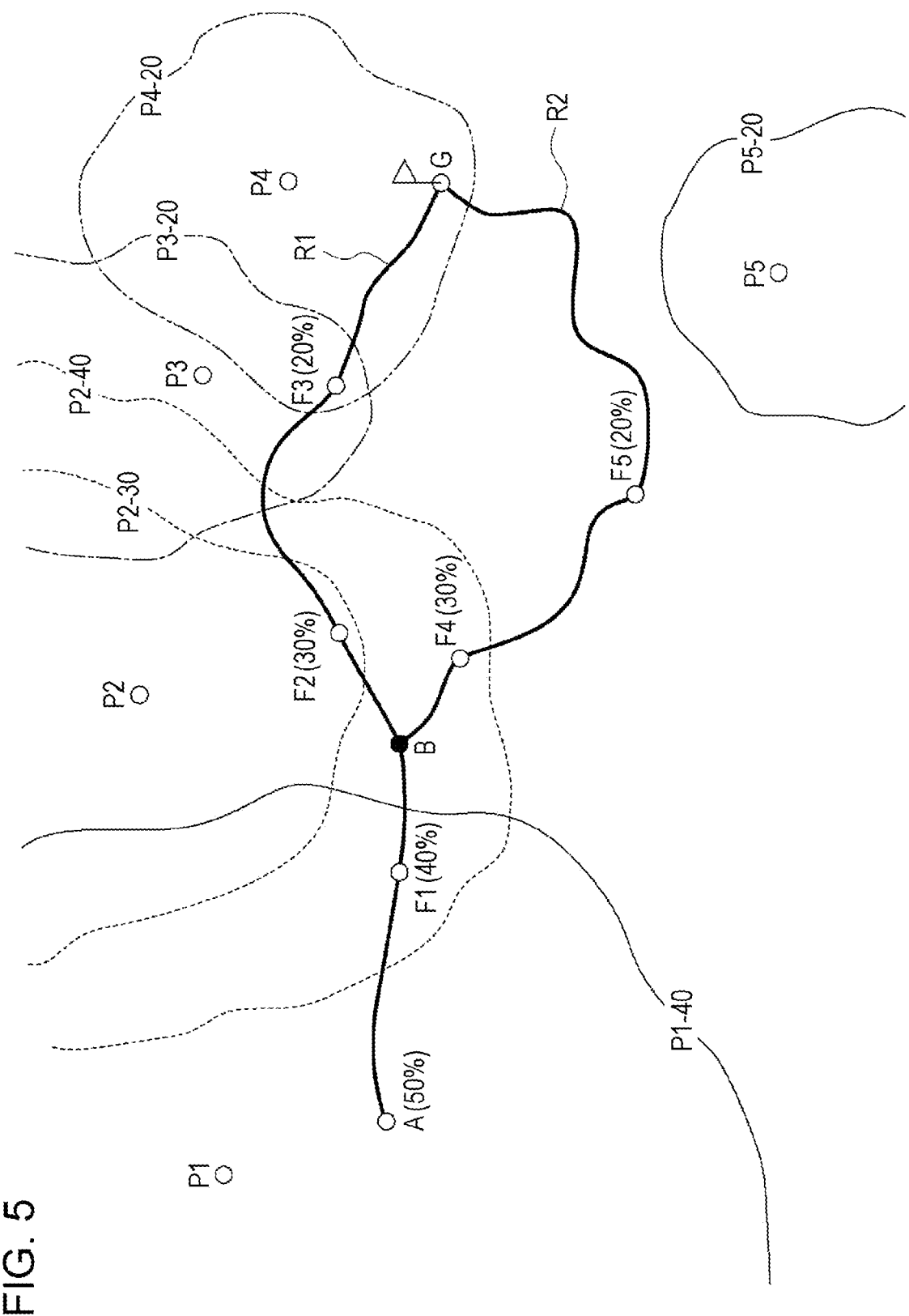
FIG. 5 is a diagram for explaining a relationship between a forecasted travel point and the reachable range.

The route search unit 12 searches for a route from the current position A of the vehicle 1 to a second point such as a destination G illustrated in FIG. 5. In addition, the route search unit 12 may present, to the user, a predetermined number of (for example, five) routes as detection results among the plurality of routes searched for, according to an arrival time or a travel distance. The user can select one route from the plurality of routes presented.

Figure 6:
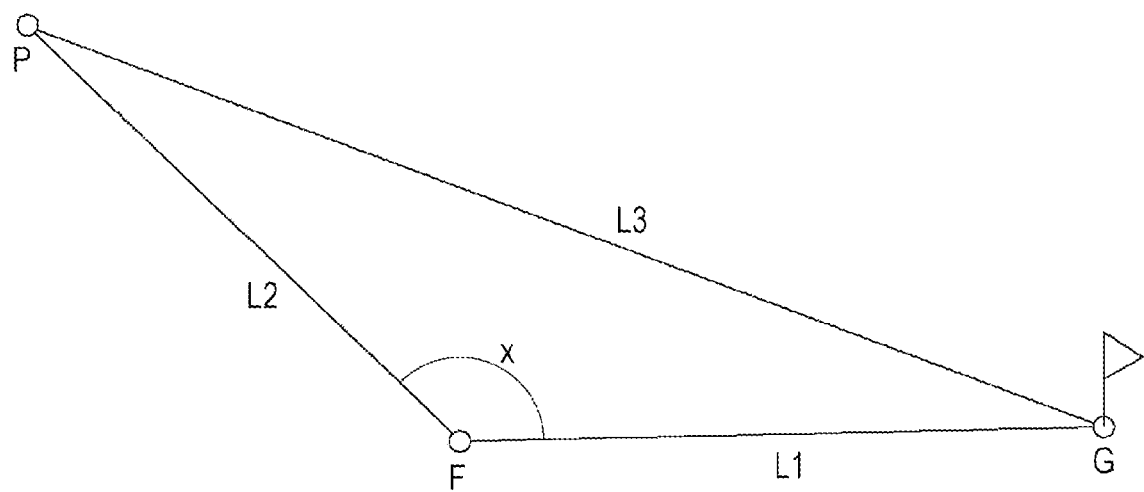
FIG. 6 is a schematic diagram illustrating an example of a positional relationship between a forecasted travel point, a destination, and a charging facility.

The control unit 5 sets a forecasted travel point F illustrated in FIG. 6 for each route searched for by the route search unit 12. A plurality of forecasted travel points F may be set for one route. As a method of setting the forecasted travel points F, for example, (n-1) forecasted travel points F may be set by equally dividing the distance from the current position A to the destination G into n, the forecasted travel points F may be set at every predetermined distance such as 1 km, or the forecasted travel points F may be set at every section of the remaining amount of power such as every 10%.

The remaining-amount-of-power acquisition unit 10 calculates the remaining amount of power forecasted for each forecasted travel point F. In a case where the forecasted travel point F is set for each predetermined section of the remaining amount of power, the forecasted travel point F is set after the remaining amount of power is calculated.

The range information acquisition unit 11 acquires information on the reachable range for each forecasted travel point F. This will be described in detail with reference to FIG. 5.

On the map illustrated in FIG. 5, the current position A of the vehicle 1, the destination G, and two routes R1 and R2 searched for by the route search unit 12 are displayed. Roads other than the routes R1 and R2 are omitted from the illustration.

The routes R1 and R2 are the same route up to a branch point B on the way, and are different routes from the branch point B to the destination G.

In the route R1, forecasted travel points F1, F2, and F3 are set. In the route R2, forecasted travel points F1, F4, and F5 are set.

The remaining amount of power of the vehicle 1 at the current position A is 50%, the forecasted remaining amount of power for the forecasted travel point F1 is 40%, the forecasted remaining amounts of power for the forecasted travel point F2 and the forecasted travel point F4 are 30%, and the remaining amounts of power for the forecasted travel point F3 and the forecasted travel point F5 are 20%. There are five charging facilities P1, P2, P3, P4, and P5 in the vicinity of the routes R1 and R2.

A reachable range P1-40 for the charging facility P1 is displayed on the map. The reachable range P1-40 indicates a range in which the vehicle 1 whose remaining amount of power is 40% or more can reach the charging facility P1.

For the charging facility P2, a reachable range P2-40 and a reachable range P2-30 are displayed. The reachable range P2-40 indicates a range in which the vehicle 1 whose remaining amount of power is 40% or more can reach the charging facility P2. Furthermore, the reachable range P2-30 indicates a range in which the vehicle 1 whose remaining amount of power is 30% or more can reach the charging facility P2.

For the charging facility P3, a reachable range P3-20 is displayed. The reachable range P3-20 indicates a range in which the vehicle 1 whose remaining amount of power is 20% or more can reach the charging facility P3.

For the charging facility P4, a reachable range P4-20 is displayed. The reachable range P4-20 indicates a range in which the vehicle 1 whose remaining amount of power is 20% or more can reach the charging facility P4.

For the charging facility P5, a reachable range P5-20 is displayed. The reachable range P5-20 indicates a range in which the vehicle 1 whose remaining amount of power is 20% or more can reach the charging facility P5.

Note that although the reachable range P5-20 is displayed on the map for convenience of explanation, it is not necessary to display the charging facility P5 and the reachable range P5-20 on the map when information is presented to the user because none of the forecasted travel points F is included in the reachable range P5-20.

The lap value calculation unit 13 calculates a lap value N for the current position A and each of the forecasted travel points F. The calculation of lap values N for the forecasted travel points F1, F2, F3, F4, and F5 will be described in detail.

The forecasted travel point F1 is included in the reachable range P1-40 and is also included in the reachable range P2-40. Since the forecasted remaining amount of power for the forecasted travel point F1 is 40%, it is indicated that the vehicle 1 can reach both the charging facility P1 and the charging facility P2. At this time, a lap value N (F1) for the forecasted travel point F1 is set to "2".

The forecasted travel point F2 is included in the reachable range P2-30. Since the forecasted remaining amount of power for the forecasted travel point F2 is 30%, it is indicated that the vehicle 1 can reach the charging facility P2. At this time, a lap value N (F2) for the forecasted travel point F2 is set to "1".

The forecasted travel point F3 is included in the reachable range P3-20 and is also included in the reachable range P4-20. Since the forecasted remaining amount of power for the forecasted travel point F3 is 20%, it is indicated that the vehicle 1 can reach both the charging facility P3 and the charging facility P4. At this time, a lap value N (F3) for the forecasted travel point F3 is set to "2".

The forecasted travel point F4 is included in the reachable range P2-40 but is not included in the reachable range P2-30. Since the forecasted remaining amount of power for the forecasted travel point F4 is 30%, it is indicated that the vehicle 1 cannot reach the charging facility P2. At this time, a lap value N (F4) for the forecasted travel point F4 is set to "0".

The forecasted travel point F5 is not included in any of the reachable ranges. This indicates that the vehicle 1 cannot reach any of the charging facilities P. At this time, a lap value N (F5) for the forecasted travel point F5 is set to "0".

In other words, the lap value N can be regarded as the number of charging facilities P that are determined to be reachable according to the reachable range for each charging facility P and the remaining amount of power for the forecasted travel point F (or the current position A).

Therefore, a high lap value N means that there are many available charging facilities P, and indicates that there are many choices of the charging facilities P.

The lap value N may be calculated in consideration of a positional relationship among the forecasted travel point F, the destination G, and the charging facility P.

A specific description will be given using the lap value N(F1) for the forecasted travel point F1 in FIG. 5.

In the above description, since it is possible to reach both the charging facility P1 and the charging facility P2 in a state where the vehicle 1 is located at the current position A, the lap value N (F1) for the forecasted travel point F1 is set to "2".

However, considering that the vehicle 1 travels from the forecasted travel point F1 to the destination G, it is necessary to travel in a direction away from the destination G to use the charging facility P1.

Such a charging facility P1 is unlikely to be used after the vehicle 1 has traveled to the forecasted travel point F1, and presentation of such a charging facility P1 as a use candidate to the user is likely to result in unnecessary information presentation. It is desirable to provide minimum necessary information to the user so as to prevent the amount of information from becoming too large.

Therefore, the lap value N may be calculated by excluding the charging facility P for which a large detour with respect to the destination G is necessary or the charging facility P for which traveling in the opposite direction is necessary.

Therefore, regarding the forecasted travel point F1 in FIG. 5, it is desirable that the lap value N (F1) is presented to the user as "1" in consideration that the charging facility P2 is reachable and also recommended to be used.

There may be several methods of determining the charging facility P to be excluded. For example, in a case where an angle x formed by a line segment L1 illustrated in FIG. 6 connecting the forecasted travel point F and the destination G and a line segment L2 illustrated in FIG. 6 connecting the forecasted travel point F and the charging facility P is within a predetermined range, the charging facility P is excluded from a calculation target of the lap value N.

As an example, in a case where the angle x formed by the line segment L1 and the line segment L2 is in the range of 120 deg or more and 240 deg or less, the charging facility P is excluded from the calculation target of the lap value N.

Note that even if the angle x formed by the line segment L1 and the line segment L2 is within the predetermined range, in a case where the distance between the forecasted travel point F and the charging facility P, that is, the length of the line segment L2, is less than a predetermined distance, the charging facility P may be included in the calculation target of the lap value N.

For example, the charging facility P that can be used by returning 200 m is sufficiently considered as an effective choice because the loss in distance is small. In addition, there is a high possibility that it is not preferable to exclude from the choices the charging facility P at such a short distance.

Alternatively, as a simpler method, the line segment L1 connecting the forecasted travel point F and the destination G may be compared with a line segment L3 (see FIG. 6) connecting the charging facility P and the destination G, and in a case where the line segment L1 is longer than the line segment L3, the charging facility P may be excluded from the calculation target of the lap value N. Also in this case, the charging facility P may be included in the calculation target if the length of the line segment L2 is less than the predetermined distance or if the difference between the length of the line segment L1 and the length of the line segment L3 is less than the predetermined distance.

Also by this method, it is possible to prevent a charging facility P for which an excessive detour is necessary from being presented as a choice.

In this example, it is important to present whether there is an available charging facility P at the time of traveling to the forecasted travel point F. Therefore, it is not preferable that the lap value N for the forecasted travel point F becomes "0" as a result of excluding all available charging facilities P due to an excessive detour because the user may misunderstand that there are no available charging facilities.

Therefore, in a case where there are one or more charging facilities P that are reachable from the forecasted travel point F, the calculated lap value N may be set to "1" or more. In other words, the lap value N may be prevented from becoming "0" as a result of exclusion of all the charging facilities P.

Thus, it is possible to notify the user that there is at least one available charging facilities P.

The selection processing unit 14 performs a process of selecting a recommended route from the one or more routes searched for by the route search unit 12.

Note that the selection processing unit 14 in this embodiment selects the recommended route so that the charging facility P can be appropriately used according to the remaining amount of power for the current position A of the vehicle 1, the forecasted remaining amount of power for the forecasted travel point F, and the lap value N.

For example, in the example illustrated in FIG. 5, the selection processing unit 14 selects the route R1 rather than the route R2 as the recommended route. A specific example of the selection process will be described later.

The presentation processing unit 15 performs a presentation process of presenting the recommended route selected by the selection processing unit 14 to the driver or the like. The presentation process is performed using, for example, a display unit (a monitor or the like) of a navigation system included in the vehicle 1.

The communication processing unit 16 performs a process of transmitting information to the server apparatus described above, a process of receiving information from the server apparatus, and the like. Furthermore, the communication processing unit 16 may be configured to be capable of vehicle-to-vehicle communication or road-to-vehicle communication.

A mode of selecting the recommended route by the selection processing unit 14 will be described with reference to FIGS. 7 and 8.

Figure 7:
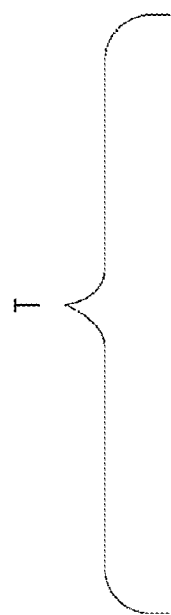
FIG. 7 is a table for explaining measurement points and lap values for each route.

FIG. 7 is a table illustrating the remaining amount of power and the lap value N for each measurement point when the current position A of the vehicle 1 and the forecasted travel points F are the measurement points.

The forecasted travel points F are set at every distance of 1 km from the current position A for each of routes R1 to R4.

For example, a forecasted travel point Fa is a generic term of a point away from the current position A by 1 km on the route R1, a point away from the current position A by 1 km on the route R2, a point away from the current position A by 1 km on the route R3, and a point away from the current position A by 1 km on the route R4.

As illustrated in FIG. 7, the routes R have different distances to the destination G, and thus have different numbers of measurement points. In particular, in the route R1, since the distance to the destination G is 15 km, a total of 16 points including the current position A and forecasted travel points Fa to Fo are set as the measurement points.

On the other hand, in the route R3, since the distance to the destination G is 12 km, a total of 13 points including the current position A and the forecasted travel points Fa to F1 are set as the measurement points.

The recommended route may be selected using the lap values N at all of the measurement points. However, in a case where the remaining amount of power is large, the user often does not consider using the charging facility P. Therefore, in order to perform more appropriate presentation, it is desirable to determine the recommended route on the basis of the lap values N in a case where the remaining amount of power falls below a predetermined value.

In this example, the predetermined value is set to 30% as an example. Therefore, the lap values N to be used for selecting the recommended route are the lap values N for the forecasted travel points Fi to Fo included in a target section T illustrated in FIG. 7.

Since the lap values N for the forecasted travel points Fa to Fh illustrated in FIG. 7 are not used for selecting the recommended route, the lap values N are not necessarily calculated. Thus, it is possible to reduce the processing load of the information providing apparatus.

In the example illustrated in FIG. 7, the forecasted remaining amount of power for the forecasted travel point Fi is 30% in common to the routes R. However, in a case where there is a difference in the presence or absence of a slope, the presence or absence of traffic congestion, or the like for each route R, the forecasted remaining amount of power is not necessarily 30% at the same forecasted travel point F.

In this case, the forecasted travel points F included in the target section T may differ for each route R.

FIG. 8 illustrates information summarizing the distance to the destination G and the lap values N in the target section T for each route R illustrated in FIG. 7.

FIG. 8 is a table illustrating, for each route R, the distance (km) to the destination G, the number of measurement points at which the lap value N is set to "0", and a standard deviation and a mean value of the lap values for the target section T.

A first example, a second example, and a third example of selecting the recommended route will be described with reference to FIG. 8.

In the first example of selecting the recommended route, the recommended route is selected by excluding a route R including the measurement point at which the lap value N is set to "0".

In the example illustrated in FIG. 8, the route R2 includes the measurement point at which the lap value N is set to "0". Therefore, the route R2 is excluded, and the recommended route is selected from among the routes R1, R3, and R4.

To select the recommended route from among the routes R1, R3, and R4, the arrival time, the travel distance, whether a toll road is used, and the like are considered. These various conditions may include conditions that are routinely selected by the user.

The second example of selecting the recommended route is based on the standard deviation of the lap values N.

In the example illustrated in FIG. 8, the standard deviations for the route R1 and the route R4 are low. A low standard deviation means that there is little variation in the lap values N for the measurement points included in the route R. In other words, a plurality of choices are likely to be present for the charging facilities P at any of the measurement points.

In this example, one route R may be selected as the recommended route from the route R1 and the route R4 in consideration of the arrival time or the like, or both the route R1 and the route R4 may be selected as recommended routes.

The third example of selecting the recommended route is performed on the basis of the mean value of the lap values N.

In the example illustrated in FIG. 8, the mean value for the route R3 is high. A high mean value means that an expected value of the lap values N is high for the measurement points included in the route R. In other words, a large number of choices are likely to be present at any of the measurement points.

In this example, the route R3 is selected as the recommended route. In a case where there are a plurality of routes R for which the mean values are equal, one route R may be selected as the recommended route in consideration of the other conditions as described above, or all of the plurality of routes R for which the mean values are high may be selected as the recommended routes.

By using the mean value of the lap values N, the route R in which the number of measurement points used as the denominator of the calculation formula of the mean value is small is likely to be selected. This is synonymous with the route R having a short distance to the destination G being likely to be selected.

Therefore, by using the mean value of the lap values N, the recommended route can be selected in consideration of both the ease of using the charging facility P and the distance to the destination G.

Finally, the recommended route may be selected using all of the first example, the second example, and the third example.

For example, using the first example, the route R2 including the measurement point at which the lap value N is set to "0" is excluded.

Subsequently, from among the routes R1, R3, and R4 that are not excluded, using the second example, the route R1 and the route R4 for which the standard deviation of the lap values N is low are selected as candidates for the recommended route.

Finally, from the routes R1 and R4, using the third example, the route R1 for which the mean value of the lap values N is high is selected as the recommended route.

Note that the order of applying the first example, the second example, and the third example is an example, and other orders may be used.

The flow of processes executed by the control unit 5 to select the recommended route will be described with reference to the flowcharts of FIGS. 9 and 10.

Figure 9:
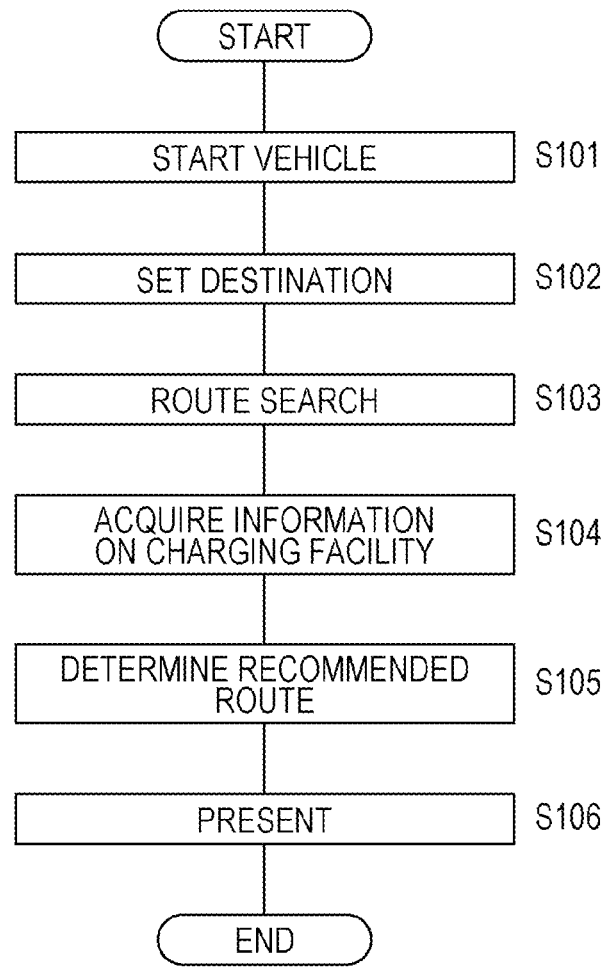
FIG. 9 is a flowchart illustrating an example of a process executed by the control unit.
Figure 10:
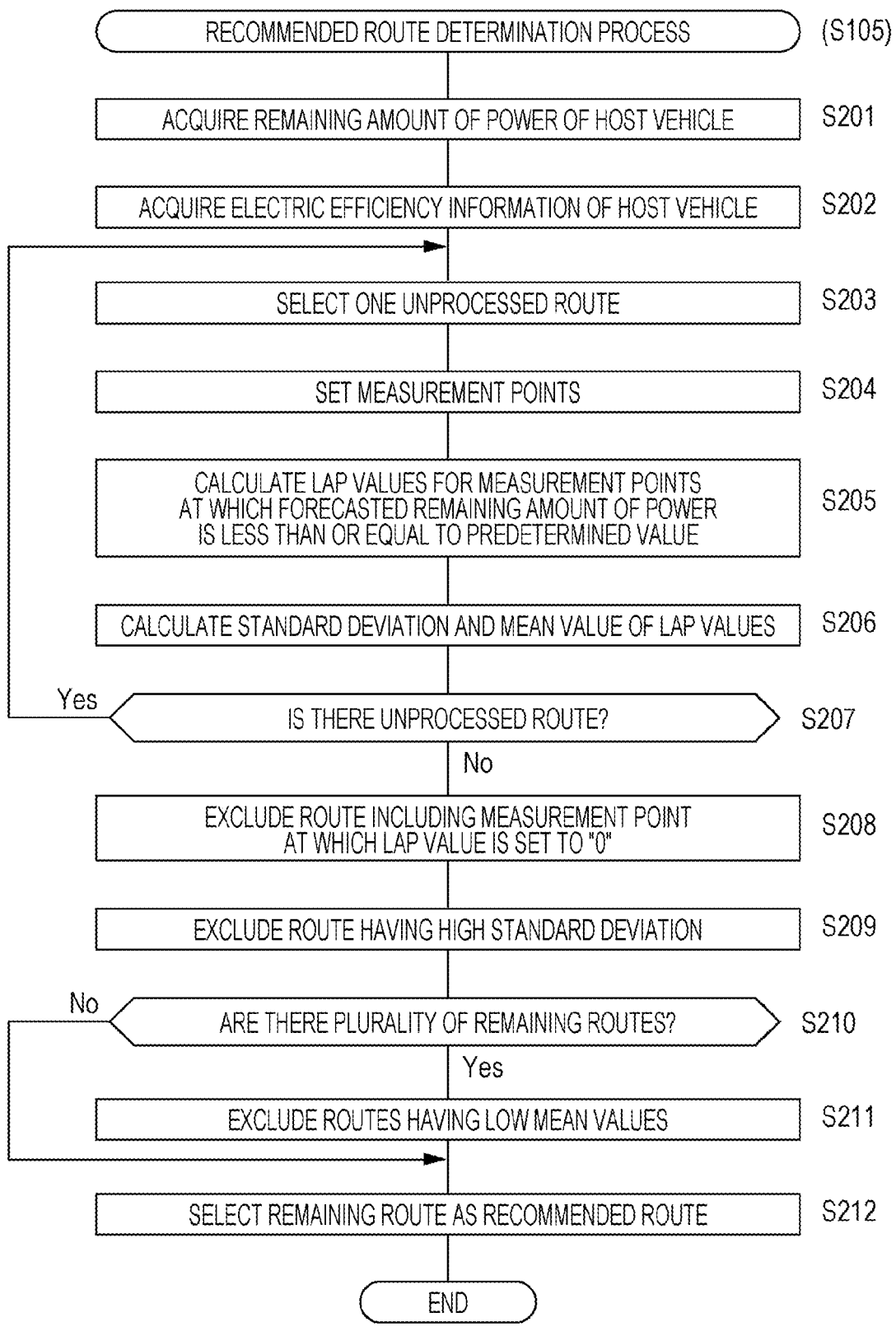
FIG. 10 is a flowchart illustrating an example of a recommended route determination process.

In response to a start switch of the vehicle 1 being pressed, the control unit 5 starts a series of processes illustrated in FIG. 9. In particular, in step S101, the control unit 5 performs each of the predetermined processes for controlling the vehicle 1.

Next, in step S102, the control unit 5 receives the setting of the destination input by the user. In this process, a process of prompting the user to input the destination may be executed.

In step S103, the control unit 5 performs a route search according to the current position A of the vehicle 1 and the input destination G. In this search, a predetermined route R may be excluded according to an optional condition set by the user. For example, in a case where an optional condition that a toll road is not to be used is set, routes R using toll roads are excluded from the search result.

In step S104, the control unit 5 acquires information on the charging facility P. The information on the charging facility P acquired by this process may be information on the charging facility P existing along routes R obtained as search results of the search process in step S103.

Furthermore, in the process of step S104, information on the reachable range of the charging facility P is acquired as the information on the charging facility P.

In step S105, the control unit 5 performs a process of determining the recommended route. In step S106, the control unit 5 performs a process of presenting the determined recommended route to the user.

Here, the recommended route determination process in step S105 will be described in detail with reference to FIG. 10.

In step S201, the control unit 5 acquires information on the remaining amount of power of the host vehicle.

Subsequently, in step S202, the control unit 5 acquires the electric efficiency information of the host vehicle. The electric efficiency information is calculated on the basis of, for example, travel data in the most recent predetermined period.

In step S203, the control unit 5 selects one unprocessed route R from among the routes R obtained by the search process in step S103 in FIG. 9. The process of step S203 is executed by the number of routes R obtained by the previous search process.

In step S204, the control unit 5 sets the measurement points. For example, as illustrated in FIG. 7, the forecasted travel points F at every 1 km from the current position A of the vehicle 1 are set as the measurement points.

In step S205, the control unit 5 calculates the lap values N for the measurement points at which the forecasted remaining amount of power is a predetermined value (for example, 30%) or less among the set measurement points. For example, in the example illustrated in FIG. 7, the lap values N for the forecasted travel points Fi to Fo are calculated.

In step S206, the control unit 5 calculates a standard deviation and a mean value of the lap values N.

In step S207, the control unit 5 determines whether there is an unprocessed route R.

If the control unit 5 determines that there is an unprocessed route R, that is, if there is a route R for which the processes of steps S204 to S206 have not been completed among the routes R obtained by the search process of step S103 in FIG. 9, the control unit 5 returns to the process of step S203 and selects one unprocessed route R.

On the other hand, if the control unit 5 determines that there are no unprocessed routes R, that is, if the control unit 5 determines that the processes of steps S204 to S206 are completed for all the routes R searched for, the control unit 5 proceeds to step S208, and excludes a route R including a measurement point at which the lap value N is set to "0" from candidates for the recommended route.

Subsequently, in step S209, the control unit 5 excludes a route R having a high standard deviation of the lap values N. For example, a route having the lowest standard deviation may remain and the other routes R may be excluded, or a route having a standard deviation that is within a predetermined range based on the lowest standard deviation may remain and the other routes R may be excluded.

In step S210, the control unit 5 determines whether there are a plurality of remaining routes R. If there are a plurality of remaining routes R, in step S211, the control unit 5 excludes routes R other than a route R having the highest mean value of the lap values N.

After the control unit 5 completes the process of step S211 or determines that there is one remaining route R in step S210, in step S212, the control unit selects the remaining route R as the recommended route.

Thus, one route R is selected as the recommended route and presented to the user.

As described above, a plurality of routes R may be selected as recommended routes and presented to the user.

In the above example, it is described that the reachable range may be calculated so as to include a margin. An example of calculating the reachable range so as to include a margin may be considered other than the above-described example.

For example, the reachable range may be set using a history of the vehicle 1 (including other vehicles) for which the remaining amount of power at the time of reaching the charging facility P is greater than or equal to a predetermined value (for example, greater than or equal to 10%).

In this case, the vehicle 1 may be configured to transmit, to the server apparatus, a history of using the charging facility and information on the reference point in a case where the remaining amount of power at the time of reaching the charging facility P is greater than or equal to a predetermined value.

Alternatively, the reachable range may be calculated using history information of a vehicle whose electric efficiency is close. That is, in a case where there are a vehicle 1 having a high electric efficiency and a vehicle 1 having a low electric efficiency, even if both the vehicles 1 are located at the same position, the information on the reachable range transmitted from the server apparatus to the vehicle 1 having the high electric efficiency and the information on the reachable range transmitted from the server apparatus to the vehicle 1 having the low electric efficiency may be different from each other.

An example of an electric vehicle or a hybrid vehicle including a high-voltage battery and a motor for traveling has been described above. However, the above-described configuration is applicable to the vehicle 1 that travels by consuming another energy source.

In that case, the above-described configuration is suitably applicable as follows. The forecasted remaining amount of power is replaced with a forecasted remaining amount of energy (a remaining amount of gasoline in a gasoline vehicle, a remaining amount of hydrogen in a hydrogen vehicle, or the like). The remaining-amount-of-power acquisition unit 10 is replaced with a remaining-amount-of-energy calculation unit. The charging facility P is replaced with an energy supply facility.

In the above-described example, the control unit 5 starts the series of processes illustrated in FIG. 9 in response to the start switch of the vehicle 1 being pressed. However, the series of processes may be performed at any other timing.

For example, the series of processes may be performed every hour or at every predetermined travel distance.

Alternatively, the series of processes may be executed when a condition changes. In particular, coming across unexpected traffic congestion, using an air conditioner, or the like, may make the electric efficiency worse than expected. In that case, the actual remaining amount of power is assumed to deviate from the forecasted remaining amount of power. In such a case, it is appropriate to redo the series of processes illustrated in FIG. 9, particularly the determination of the recommended route. Therefore, if the difference between the forecasted remaining amount of power and the actual remaining amount of power is periodically calculated and the difference increases, at least the processes of steps S103, S104, S105, and S106 illustrated in FIG. 9 may be performed.

The above-described examples may be combined in any manner.

As described in the above examples, the information providing apparatus included in the vehicle 1 includes one or more processors and a storage medium in which a program to be executed by the one or more processors is stored. The program includes one or more instructions. The one or more instructions cause the one or more processors to perform: a remaining-amount-of-power acquisition process (the process by the remaining-amount-of-power acquisition unit 10) of acquiring the forecasted remaining amount of power for the forecasted travel point F (F1, F2. F3, F4, F5) of the host vehicle (the vehicle 1); a range information acquisition process (the process by the range information acquisition unit 11) of acquiring the reachable range (the reachable range P1-40 or the like) calculated as a predetermined range from the charging facility P on the basis of a record of the remaining amount of power of the vehicle 1 and a record of using the charging facility P (P1, P2, P3, P4, P5) by the vehicle 1; and a presentation process (the process by the presentation processing unit 15) of presenting a scheduled travel route (route R, R1, R2, R3, R4) selected on the basis of the reachable range.

Thus, it is possible to present the scheduled travel route such that the forecasted traveling point F is included in the reachable range of any charging facility P.

This can prevent a situation in which there are no available charging facilities P.

Furthermore, by presenting the reachable range calculated as the predetermined range from the charging facility P, it is possible for the user to grasp the positional relationship between the scheduled travel route of the vehicle 1 and the reachable range. Therefore, it is possible to visually grasp whether it is easy to use the charging facility for each route, which is preferable.

In addition, the one or more instructions may cause the one or more processors to perform: as the remaining-amount-of-power acquisition process (the process by the remaining-amount-of-power acquisition unit 10), a process of acquiring the forecasted remaining amount of power for each of the forecasted travel points F of the host vehicle (the vehicle 1) on the plurality of scheduled travel routes (the routes R); as the range information acquisition process (the process by the range information acquisition unit 11), a process of acquiring the reachable range for each of the plurality of charging facilities P; and, as the presentation process (the process by the presentation processing unit 15), a process of presenting, as the recommended route, the scheduled travel route selected from the plurality of scheduled travel routes on the basis of a relationship between the plurality of forecasted travel points F and the plurality of reachable ranges.

By acquiring the forecasted remaining amount of power for each of the forecasted travel points F, it is possible to appropriately present the available charging facility P at the points on the route.

Therefore, the user can appropriately grasp whether the charging facility P is available at a predetermined time point after the vehicle 1 starts traveling from the current position A. This enables the user, in a state of being located at the current position A, to select a route in consideration of future use of the charging facility P.

In addition, the one or more instructions may cause the one or more processors to perform a selection process (the process by the selection processing unit 14) of selecting the recommended route by excluding the scheduled travel route (the route R) including the forecasted travel point F not included in any of the reachable ranges.

Thus, the recommended route is selected such that at least one or more charging facilities P are available at the forecasted travel points F set on the scheduled travel route.

This can more appropriately prevent a situation in which there are no available charging facilities P.

Furthermore, the one or more instructions may cause the one or more processors to perform: a lap value calculation process (the process by the lap value calculation unit 13) of determining whether the forecasted travel point F is included in the reachable range, calculating, as a lap value N for the forecasted travel point F that is a process target, the number of the charging facilities P for which the forecasted travel point F that is the process target is included in the reachable range, and calculating the lap value N for each of the forecasted travel points F; and a selection process (the process by the selection processing unit 14) of selecting the recommended route according to the standard deviation of the lap values N.

Thus, a route in which the number of available charging facilities P is biased depending on the travel position is less likely to be selected as the recommended route.

Therefore, the recommended route is selected such that the number of available charging facilities P is appropriate at any position on the route. This prevents the user from being excessively worried about charging until the destination G.

In addition, the one or more instructions may cause the one or more processors to perform: a lap value calculation process (the process by the lap value calculation unit 13) of determining whether the forecasted travel point F is included in the reachable range, calculating, as a lap value N for the forecasted travel point F that is a process target, the number of the charging facilities P for which the forecasted travel point F that is the process target is included in the reachable range, and calculating the lap value N for each of the forecasted travel points F; and a selection process (the process by the selection processing unit 14) of selecting the recommended route according to the mean value of the lap values N.

Thus, a route having a large number of available charging facilities P is likely to be selected as the recommended route.

This can reduce the possibility that the vehicle 1 travels through a point where no charging facilities P are available.

The invention claimed is:
1. An information providing apparatus comprising:
one or more processors; and
a storage medium in which a program to be executed by the one or more processors is stored,
wherein the program includes one or more instructions, and
wherein the one or more instructions cause the one or more processors to perform:
a remaining-amount-of-power acquisition process of retrieving information about an amount of power from a traveling battery of a host vehicle, and acquiring a forecasted remaining amount of power for the host vehicle to travel to a forecasted travel point based on the information retrieved from the traveling battery;

a range information acquisition process of:
    retrieving a record of a remaining amount of power of a vehicle and a record of using the charging facility of the vehicle, and
    acquiring a reachable range calculated as a predetermined range from a charging facility on a basis of the record of the remaining amount of power of the vehicle and the record of using the charging facility of the vehicle, wherein
    the reachable range is a range in which the vehicle that has the remaining amount of power or more than the remaining amount of power is able to reach the charging facility; and
a presentation process of presenting a scheduled travel route selected on a basis of the reachable range on a map of a display of the host vehicle.

2. The information providing apparatus according to claim 1,
    wherein the one or more instructions cause the one or more processors to perform:
    as the remaining-amount-of-power acquisition process, a process of acquiring the forecasted remaining amount of power for each of the forecasted travel points of the host vehicle on the scheduled travel routes;
    as the range information acquisition process, a process of acquiring the reachable range for each of a plurality of the charging facilities; and
    as the presentation process, a process of presenting, as a recommended route, the scheduled travel route selected from the scheduled travel routes on a basis of a relationship between the forecasted travel points and the reachable ranges.

3. The information providing apparatus according to claim 2,
    wherein the one or more instructions cause the one or more processors to perform:
    a selection process of selecting the recommended route by excluding the scheduled travel route including the forecasted travel point not included in any of the reachable ranges.

4. The information providing apparatus according to claim 1,
    wherein the one or more instructions cause the one or more processors to perform:
    a lap value calculation process of determining whether the forecasted travel point is included in the reachable range, calculating, as a lap value for the forecasted travel point that is a process target, a number of the charging facilities for which the forecasted travel point that is the process target is included in the reachable range, wherein the lap value is calculated on a basis of a positional relationship among the forecasted travel point, a destination of the host vehicle, and the charging facility.

5. The information providing apparatus according to claim 4, wherein the lap value calculation process comprising:
    in response to an angle formed by a first line segment connecting the forecasted travel point and the destination and a second line segment connecting the forecasted travel point and the charging facility is within a predetermined range, excluding the charging facility from the calculation target of the lap value.

6. The information providing apparatus according to claim 4, wherein the lap value calculation process comprising:
    in response to an angle formed by a first line segment connecting the forecasted travel point and the destination and a second line segment connecting the forecasted travel point and the charging facility is within a predetermined range, and a distance between the forecasted travel point and the charging facility is within a first predetermined distance, including the charging facility in the calculation target of the lap value.

7. The information providing apparatus according to claim 4, wherein the lap value calculation process comprising:
    in response to an angle formed by a first line segment connecting the forecasted travel point and the destination and a second line segment connecting the forecasted travel point and the charging facility is within a predetermined range, and a difference between the distance from the forecasted travel point to the destination and the distance from the charging facility to the destination is within a second predetermined distance, including the charging facility in the reachable range in the calculation of the lap value.

8. An information providing apparatus comprising:
one or more processors; and
a storage medium in which a program to be executed by the one or more processors is stored,
wherein the program includes one or more instructions, and
wherein the one or more instructions cause the one or more processors to perform:
a remaining-amount-of-power acquisition process of retrieving information about an amount of power from a traveling battery of a host vehicle, and acquiring a forecasted remaining amount of power for the host vehicle to travel to each forecasted travel point on scheduled travel routes;
a range information acquisition process of:
    retrieving a record of a remaining amount of power of a vehicle and a record of using the charging facility of the vehicle, and
    acquiring a reachable range, for each of a plurality of charging facilities, calculated as a predetermined range from the charging facility on a basis of the record of the remaining amount of power of the vehicle and the record of using the charging facility of the vehicle,
a lap value calculation process of determining whether the forecasted travel point is included in the reachable range, calculating, as a lap value for the forecasted travel point that is a process target, a number of the charging facilities for which the forecasted travel point that is the process target is included in the reachable range, and calculating the lap value for each of the forecasted travel points;
a selection process of selecting the recommended route according to a standard deviation of the lap values; and
a presentation process of presenting, as a recommended route, a scheduled travel route selected from the scheduled travel routes on a basis of a relationship between the forecasted travel points and the reachable ranges on a map of a display of the host vehicle.

9. An information providing apparatus comprising:
one or more processors; and
a storage medium in which a program to be executed by the one or more processors is stored, wherein the program includes one or more instructions, and wherein the one or more instructions cause the one or more processors to perform:

a remaining-amount-of-power acquisition process of retrieving information about an amount of power from a traveling battery of a host vehicle, and acquiring a forecasted remaining amount of power for the host vehicle to travel to each forecasted travel point on scheduled travel routes;

a range information acquisition process of:

retrieving a record of a remaining amount of power of a vehicle and a record of using the charging facility of the vehicle, and acquiring a reachable range, for each of a plurality of charging facilities. calculated as a predetermined range from the charging facility on a basis of the record of the remaining amount of power of the vehicle and the record of using the charging facility of the vehicle;

a lap value calculation process of determining whether the forecasted travel point is included in the reachable range, calculating, as a lap value for the forecasted travel point that is a process target, a number of the charging facilities for which the forecasted travel point that is the process target is included in the reachable range, and calculating the lap value for each of the forecasted travel points;

a selection process of selecting the recommended route according to a mean value of the lap values; and a presentation process of presenting, as a recommended route, a scheduled travel route selected from the scheduled travel routes on a basis of a relationship between the forecasted travel points and the reachable ranges on a map of a display of the host vehicle.

* * * * *